Aug. 28, 1928.

J. W. WELSH 1,682,650

OPHTHALMIC MOUNTING

Filed Aug. 24, 1925

Inventor
James W. Welsh
by David Rines
Attorney

Patented Aug. 28, 1928.

1,682,650

UNITED STATES PATENT OFFICE.

JAMES WILSON WELSH, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

OPHTHALMIC MOUNTING.

Application filed August 24, 1925. Serial No. 52,001.

The present invention relates to ophthalmic mountings, and more particularly to mountings of the "all-shell" type, constituted largely of non-metal material like zylonite, horn, and tortoise-shell.

The lens-holding fronts of mountings of the above-described character are usually made of sheet stock. Temples are hinged to the end pieces of the lens-holding front. When the mounting is worn upon the face, with the temples in open position, and the rear ends of the temples bearing against the wearer's skull, their forward ends exert pressure upon the end pieces of the lens-holding front, causing the front to curve at the bridge, and throwing the lens-holding rims out of alignment.

It is therefore an object of the present invention to improve upon ophthalmic mountings of the above-described character, to the end that the lens-holding rims may remain in substantial alignment when the mounting is worn upon the face.

With this object in view, a feature of the invention resides in providing the bridge with a bend opposite in direction to the bend imparted thereto by the open temples, the two bends thus neutralizing each other and resulting in the lens-holding rims being in alignment when the mounting is in use.

Figure 1:
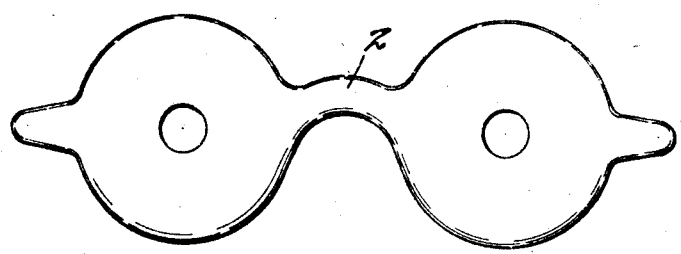
Figure 2:
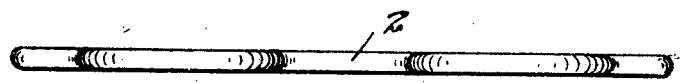
Figure 3:
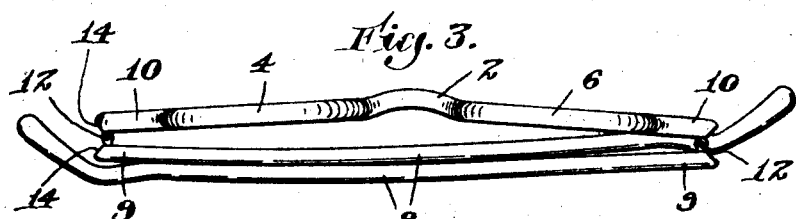
Figure 4:
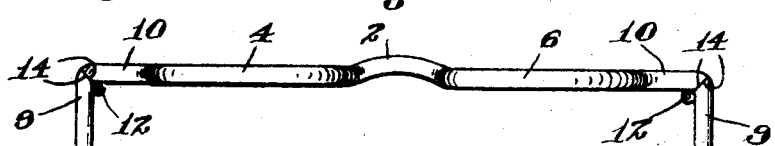

Other and further objects will be explained in connection with the accompanying drawings, in which Fig. 1 is a front elevation of a sheet of stock intended to be manufactured into a lens-holding front in accordance with the present invention; Fig. 2 is a plan of the same; Fig. 3 is a plan of an ophthalmic mounting constructed according to a preferred embodiment of the present invention; and Fig. 4 is a similar view, the parts being shown in the position occupied by the mounting when the mounting is in use upon the wearer's face.

The lens-holding-front blank shown in Figs. 1 and 2 is suitably prepared from a flat sheet of non-metal material so as to have the desired external contour of the lens-holding front. Before this blank is manufactured into finished form, the bridge 2 thereof is bent, as shown in Fig. 3. The blank is then finished in well known manner, so as to contain two lens-holding rims 4 and 6, each lying in its own plane, but the planes diverging from the bridge. Temples 8 are pivoted at their forward ends 9 to the end pieces 10 of the lens-holding front by hinges 12. The end portions of the temples and of the lens-holding front to which they are pivoted are beveled, as shown at 14. When the temples are swung about their pivots, therefore, the beveled portions will be caused to abut, thereby limiting the outward movement of the temples. Any further movement of the temples, such as is caused by placing the temples behind the ears of the wearer, will cause the resilient material of the bridge 2 to bend in the opposite direction to the direction of bend originally imparted thereto, away from the temples, causing the lens-holding front to straighten out, as shown in Fig. 4. The mere engagement of the rear portions (not shown) of the temples with the opposite sides of the wearer's skull causes the lens-holding front to be flexed into a plane, so that the lenses are automatically properly positioned before the eyes of the wearer.

The degree of bend shown in Fig. 3 may be from 3° to 12°, or smaller or larger, as may be required by the circumstances of the case.

Modifications will readily occur to persons skilled in the art and are considered to fall within the spirit and scope of the invention, as defined in the appended claims.

What is claimed is:

1. An ophthalmic mounting comprising a lens-holding front and two temples, the lens-holding front having two lens-holding rims connected by a bridge and constituted of a sheet of non-metal material, the non-metal material being bent at the bridge in a direction towards the temples, whereby the lens-holding rims lie substantially in planes diverging from the bridge towards the respective temples, the non-metal material being resilient and being adapted to be flexed into substantially a plane by the engagement of the temples with the skull of a wearer.

2. An ophthalmic mounting comprising a resilient lens-holding front and two temples, the lens-holding front having two lens-holding rims connected by a bridge, each lens-holding rim lying in substantially a plane, and the planes diverging from the bridge in directions towards the respective temples, each temple having a forward portion and a rear portion, the rear portions being adapted to engage opposite sides of a wearer's skull, the temples being pivoted to the lens-holding front at their forward portions, and the pivotal movement of the temples being limited, whereby the lens-holding front will be flexed into substantially a plane by the engagement of the rear portions of the temples with the opposite sides of the skull.

3. An ophthalmic mounting comprising a lens-holding front and two temples, the lens-holding front having two lens-holding rims connected by a bridge and constituted of a sheet of resilient non-metal material, the non-metal material being bent at the bridge in a direction towards the temples, whereby the lens-holding rims lie substantially in planes diverging from the bridge towards the respective temples, each temple having a forward portion and a rear portion, the rear portions being adapted to engage opposite sides of a wearer's skull, the temples being pivoted to the lens-holding front at their forward portions, and the pivotal movement of the temples being limited, whereby the lens-holding front will be flexed into substantially a plane by the engagement of the rear portions of the temples with the opposite sides of the skull.

In testimony whereof, I have hereunto subscribed my name.

JAMES W. WELSH.